Sept. 17, 1968   J. D. HAGON   3,401,765
VEHICLE SAFETY DEVICE
Filed July 11, 1966
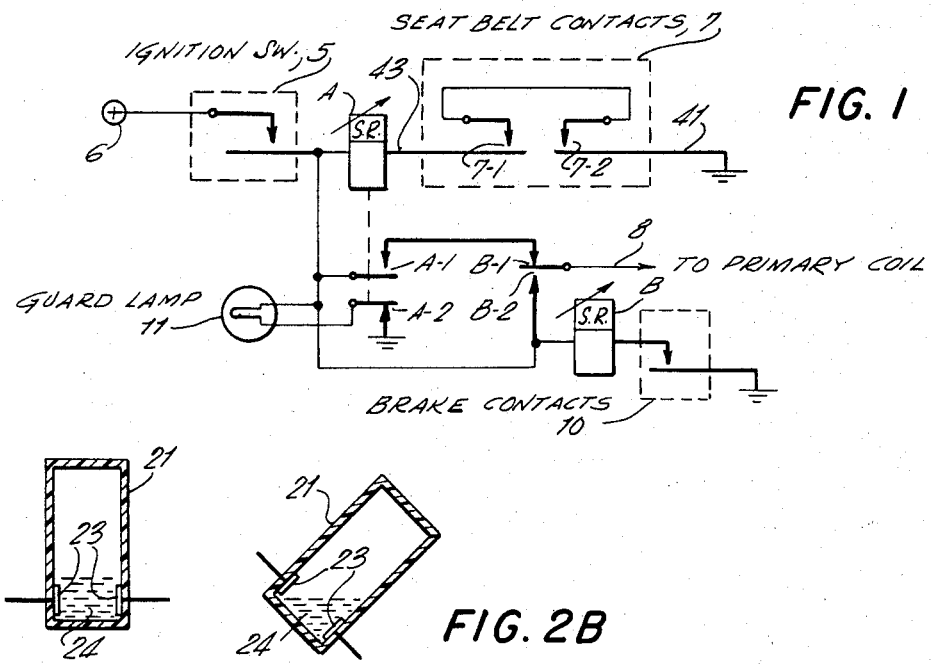
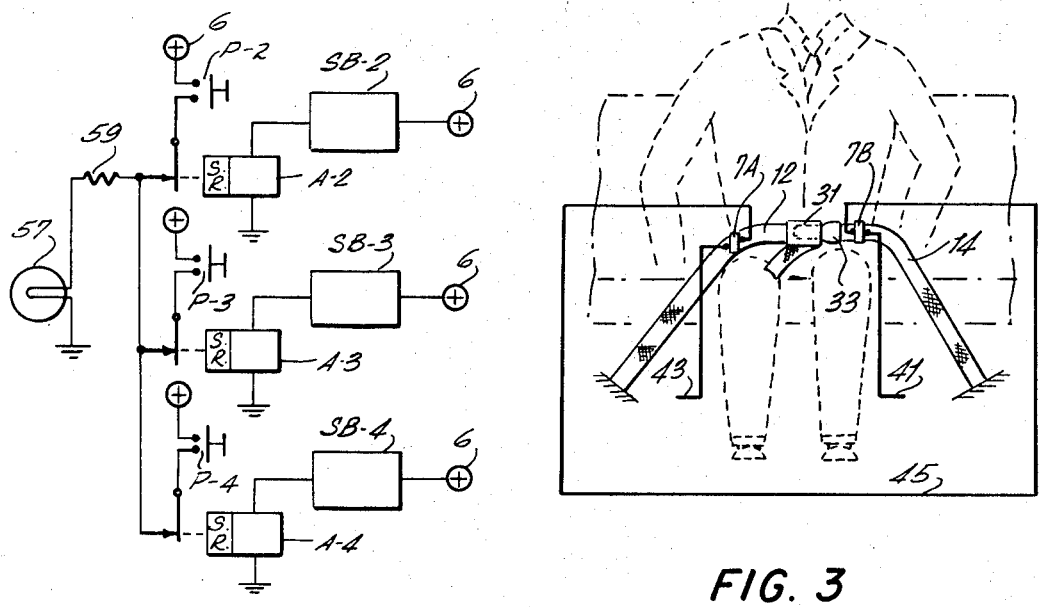
INVENTOR.
John D. Hagon
Amster & Rothstein
ATTORNEYS

United States Patent Office 3,401,765
Patented Sept. 17, 1968

3,401,765
VEHICLE SAFETY DEVICE
John D. Hagon, 36 Washington Place,
Northport, N.Y. 11768
Filed July 11, 1966, Ser. No. 564,258
5 Claims. (Cl. 180—82)

ABSTRACT OF THE DISCLOSURE

A safety circuit for use in an automobile. The ignition system can be energized only if the driver is wearing his seat belt. At least one position-responsive switch is attached to the belt and included in the ignition circuit. The ignition circuit can be completed if the seat belt is worn, the switch being mounted such that it operates to complete the ignition circuit when the belt is properly positioned around the driver. If the belt is not worn, the position-responsive switch will normally be in a position such that the ignition circuit cannot be completed.

---

This invention relates to vehicle safety devices, and more particularly to mechanisms for preventing the running of automobile engines if seat belts are not worn.

The growing number of automobile fatalities is a problem of great current concern. It is recognized that the wearing of a seat belt will often save the life of the driver or a passenger in an accident. Unfortunately, however, many people do not wear seat belts, even if their cars are equipped with them, particularly on short trips.

It is an object of this invention to prevent the running of an automobile engine if the driver's seat belt is not worn.

There are times, however, when it is desirable that the car engine be run even if the seat belt is not worn. For example, a mechanic working on an engine may have to turn it on and observe its operation even though no one sits in the driver's seat. Accordingly, it is another object of this invention to permit the running of an automobile engine even if a seat belt is not on under certain selected conditions.

In the ordinary automobile, when the ignition switch is turned on the car battery is connected to the primary coil. In accordance with the principles of my invention, this connection is established only if the driver's seat belt is buckled. This safety precaution by itself is not sufficient, however, because it has already been established that drivers are prone to cheat when it comes to wearing seat belts. If the only thing preventing the running of the engine is the buckling of the belt, a driver is likely to merely buckle the belt without putting it around himself. For this reason, the contacts controlled by the wearing of the belt are such that they close the connection of the battery to the primary coil only if the belt is worn by the driver, as well as being buckled.

It is to be expected that the belt contacts will often be opened momentarily, for example, if the driver bends over to take something out of the glove compartment. As will be apparent from the description below, at this time the belt contacts may be broken. Ordinarily this would cause the motor to be turned off. To avoid this accidental cut-off the ignition circuit includes a slow release relay which maintains the connection for a predetermined time period even with the seat belt contacts open.

In such a case it may be desirable that the connection be maintained even if the belt contacts are opened, i.e., the seat belt is effectively unbuckled, for a period up to one or two minutes. On the other hand, there are certain factors weighing in favor of limiting this time period. For example, many people when involved in a car accident forget to turn off the ignition, and immediately attempt to flee the vehicle. With the motor still running subsequent serious damage may take place. But if in order to flee the vehicle the driver must take off his seat belt, the motor will be turned off automatically. In such a case it is desirable that the motor be turned off as soon as possible after the belt is unbuckled. (The delay may be in the order of milliseconds if all that is to be prevented is contact jitter.) Accordingly, in the illustrative embodiment of the invention the slow release relay is provided with a variable delay. The delay may be adjusted either at the factory or by the driver. The fact that there is an upper limit to the time delay prevents the driver from completely eliminating the need for the seat belt in order to drive the car.

There are times when it is necessary to keep the motor running even with no driver in the driver's seat, i.e., at a time when it is impossible to support the seat belts as required to maintain the ignition circuit. One such case is that in which a driver wants to get out of the car for a moment, but to keep the motor running. In accordance with another aspect of my invention, another circuit is provided for maintaining the ignition circuit, even in the absence of the buckling of the seat belt, in an operative condition. The operation of the emergency or hand brake closes the ignition circuit. This is very desirable from a safety standpoint. If the driver is in his seat, the car is presumably under control. If he is not, it is advisable to have the brake operated whether the car is being worked on by a mechanic, or if it is left idling.

In accordance with an aspect of the illustrative embodiment of my invention, as described above, the ignition circuit will not operate merely upon the buckling of a seat belt. It is necessary that the seat belt be placed properly around the driver. This is accomplished by using two mercury switches. Each of these switches is characterized by the fact that it completes a circuit, i.e., the switch closes, only if it is in an upright position. If the switch is not upright, the contacts do not close. One such switch is placed on each part of the seat belt. The two of them are connected in series, and both switches are closed if the seat belt is worn by the driver since in this case both switches are upright.

It is a feature of this invention to normally enable the operation of the ignition circuit of an automobile only if the driver's seat belt is buckled.

It is another feature of this invention to provide at least one switch on the seat belt which is positioned such that it normally controls the ignition circuit only if the seat belt is properly in place on the driver.

It is a still further feature of this invention to enable the ignition circuit to be completed, even if the seat belt is not worn by the driver, if the hand brake is operated.

Further objects, features and advantages of my invention will become apparent upon consideration of the following detailed description in conjunction with the drawings in which:

FIG. 1 depicts schematically an illustrative embodiment of my invention;

FIGS. 2A and 2B depict symbolically one of the mercury switches used in the embodiment of FIG. 1, in two different positions;

FIG. 3 depicts a seat belt in place around a driver and shows the preferred positions of the two mercury switches used in the embodiment of FIG. 1; and FIG. 4 depicts an auxiliary circuit which operates a warning lamp if any of the passengers is not wearing his seat belt.

Referring to FIG. 1, battery 6 powers the electrical system of the automobile. This battery is connected to various parts of the car not shown in the drawing. In the conventional automobile, when ignition switch 5 is operated, the battery is connected to the primary coil, shown at 8. In a system incorporating the principles of my invention, however, the connection to the primary coil is normally established only if the driver's seat belt is buckled around him.

As will be described below, with the seat belt properly in place around the driver, seat belt contacts 7-1 and 7-2 are closed. When the ignition switch is operated, current flows from battery 6 through the switch, the winding of relay A and the seat belts contacts to ground. Relay A thus operates. If the seat belt contacts are not closed, the A relay cannot operate.

If the ignition switch is operated while the seat belt is off, relay A does not operate and contacts A-2 remain closed. Guard lamp 11 operates, current flowing from battery 6 through the ignition switch, the lamp filament and contacts A-2 to ground. The operation of this lamp informs the driver that the car will not start until he buckles his seat belt.

If the driver then puts on the belt, or if the belt is put on and the ignition switch is then operated, relay A operates. Contacts A-2 open and the guard lamp stays off. At the same time contacts A-1 close. Since contacts B-1 are normally closed, it is seen that with the operation of relay A the potential of battery 6 is extended through the ignition switch and contacts A-1 and B-1 to the primary coil. The engine may thus be started.

As previously described, it is often desirable to enable the car engine to operate even if the driver is not in his seat, provided, however, that the emergency or hand brake is on. Brake contacts 10 close when the brake is on. With ignition switch 5 on, current flows from battery 6 through the ignition switch, the winding of relay B and the brake contacts to ground. Relay B operates and contacts B-2 close. The battery is thus connected directly through the ignition switch to the primary coil. Thus, the engine may be turned on if either the seat belt is in place on the driver, or the hand brake is on.

As shown in the drawing, relay A is of the slow release type, and the time delay is adjustable. In some situations it may be necessary to momentarily open the seat belt contacts. This might occur, for example, if the driver bends over to take something out of the glove compartment, in which case the mercury switches may not be in their vertical positions. Similarly, if the driver comes to a toll booth he may find it necessary to take off his seat belt to gain access to his wallet. It is not to advantage to cause the engine to turn off immediately. Because relay A is of the slow release type, even if the seat belt contacts open the relay remains operative with contacts A-1 closed for a predetermined time period. The maximum period is preferably one or two minutes. If a greater amount of time is required, the hand brake may be operated.

Similarly, relay B is also of the slow release type and has a variable time delay. The maximum time delay is preferably a few seconds. The slow release feature is provided primarily to avoid shutting off of the engine while the emergency brake is being released and the seat belt is being buckled.

In the illustrative embodiment of the invention there are two seat belt contacts 7-1 and 7-2, each controlled by a respective switch. One of the seat belt switches is shown in cross-section in FIG. 2A. Container 21 includes two contacts 23 which are connected via respective conductors to the outside of the case. Inside the case is a pool of mercury 24. If the mercury switch is maintained in an upright or vertical position, the two contacts are connected via the mercury pool, and the switch is closed. On the other hand, if the mercury switch is not upright, as shown in FIG. 2B, it will be seen that the mercury pool does not electrically connect the two contacts. In such a case, the switch is open.

FIG. 3 shows the seat belt in place around the driver.

As in the conventional automobile, the two sections of the seat belt are attached to the car body at the floor. Catch 31 is connected to section 12 of the belt, and insert 33 is connected to section 14. Section 14 is of predetermined length. The position of the catch on the belt, however, is adjustable in order that the belt be suitable for use with many drivers.

Since the position of the insert on section 14 of the belt does not vary to too great an extent (except for minor differences in the physiques of different drivers), mercury switch 7B, which controls contacts 7-2, may be placed near insert 33. In all cases the switch will be in a vertical or upright position when the belt is around the driver. Catch 31, on the other hand, is adjustable with respect to section 12 of the belt. For this reason mercury switch 7A, which controls contacts 7-1, cannot be placed at a pre-established position on the belt near the driver. The switch is placed instead, as shown, on that part of the belt near the back of the seat where the belt goes down to the floor. Since section 12 of the belt is at an angle in this region, the mercury switch is not placed on the belt perpendicular to its length. Instead, it is placed at an angle such that the switch will be in an upright position when the belt is in place around the driver.

As seen in FIG. 3, each of the switches has two output conductors. Conductor 45 connects the two switches in series. The other two output conductors, 41 and 43, are connected in the safety circuit. One of these goes to ground and the other goes to the winding of the A relay as shown in FIG. 1. Although the various conductors are shown loose in FIG. 3, it is to be understood that in a practical system the conductors would be included in sections 12 and 14 of the belt. The two conductors on each section would follow the belt to the floor. The wiring connections may be made, for example, beneath the carpeting or underneath the front seat. The relays may be mounted in a sealed box on the engine side of the fire wall.

Many alternative designs are possible. For example, the mercury switches might be placed on the belt such that the contacts are normally closed, and opened only if the belt is properly in place. In this case, the contacts might be placed in a shunting circuit which diverts current from the winding of relay A unless the belt is in place. It is not even necessary to use mercury switches. Any two-state device may be used, provided the switching of the states is determined by the proper wearing of the belt by the driver.

While the circuit previously described may insure the driver's safety, it is of no help to the passengers in the car. For this reason the auxiliary circuit of FIG. 4 may be provided. If any passengers is not wearing his seat belt, warning light 57 goes on. This notifies the driver that at least one of his passengers is not wearing his belt. While it is possible to use the auxiliary circuit of FIG. 4 to shut off the ignition circuit, i.e., by replacing the warning light 57 by a relay whose contacts are in series with the winding of the A relay in FIG. 1, the safety circuit of FIG. 4 is shown in its simplest form.

Contacts P-2, P-3 and P-4 are controlled by passengers sitting in their respective seats. Each of these contacts is controlled by a switch which may, for example, be placed under the respective seat. (While the circuit of FIG. 4 is designed for three passengers, the extension of it for more will be apparent.) Seat belt contacts SB-2, SB-3 and SB-4 are similar to seat belt contacts 7, each of these mercury switch contacts being controlled by the respective passenger wearing his seat belt.

With no one in the first passenger seat, contacts P-2 are open, and current cannot flow from battery 6 through these contacts, resistor 59 and the lamp filament. However, if a passenger is sitting in the seat controlling contacts P-2, they close and the lamp goes on. This notifies the driver that someone is sitting in the car without wearing his seat belt. If the seat belt is buckled, however, contacts SB-2 close and current flows from battery 6 through these contacts and the winding of relay A-2 to ground. The relay operates and with the opening of its contacts, current no longer flows through the lamp filament. In a similar manner, contacts P-3 and SB-3 control the operation of the lamp, as do contacts P-4 and SB-4.

It will be noted that in the circuit of FIG. 1 there are no seats contacts equivalent to contacts P-2, P-3 and P-4. These contacts are included in the circuit of FIG. 4, however, because the mere unbuckling of a seat belt should not be sufficient to operate the warning light. If there is no passenger in a particular seat, there is no concern about the unused seat belt. For this reason the seat contacts initially control the illumination of the lamp; the lamp operates to begin with only if someone is sitting in a passenger seat. If the respective seat belt is being used, the lamp is turned off. Relays A-2, A-3, and A-4 are also slow release relays. The warning light operates only if a seat belt is not worn for a predetermined time period.

Although the auxiliary circuit of FIG. 4 can be used to shut off the ignition system in the event one of the passengers is not wearing his seat belt, in most situations it will be more advantageous to merely operate a warning light. Were the ignition to be shut off in the absence of the wearing of a passenger's seat belt, it might be difficult to carry cargo in the automobile. If an object were placed on a passenger's seat, the respective P contacts would operate to shut off the ignition system unless the respective seat belt were in use. And it might be difficult to wrap the seat belt around the cargo. Also, an individual warning lamp may be provided for each passenger. These lamps may be on the dashboard so that the driver will know who is not wearing his belt. This is especially advantageous on school buses.

Although the invention has been described with reference to particular embodiments, these are merely illustrative of the application of the principles of the invention. For example, position-responsive switches may be appropriately placed on a shoulder harness. Thus it is to be understood that numerous modifications may be made therein and other arrangements may be devised without departing from the spirit and scope of the invention.

What is claimed is:

1. A safety circuit for the ignition system of a vehicle comprising a seat belt, at least one switch case mounted on said belt, said switch case having a normally open electrical connection therethrough and including means therein operative to establish said electrical connection when the switch case is maintained in a predetermined orientation, said case being mounted on said belt such that when said belt is in place around the driver seated in said vehicle said switch case is maintained in said pre-determined orientation, and means responsive to the establishing of said electrical connection through said switch case for enabling the operation of said ignition system.

2. A safety circuit for the ignition system of a vehicle in accordance with claim 1 wherein said enabling means includes means for enabling the operation of said ignition system for a predetermined time interval even after said seat belt is removed from around said driver.

3. A safety circuit for the ignition system of a vehicle in accordance with claim 2 further including means responsive to the operation of the hand brake on said vehicle for enabling the operation of said ignition system independent of the orientation of said switch case.

4. A safety circuit for the ignition system of a vehicle in accordance with claim 1 further including means responsive to the operation of the hand brake on said vehicle for enabling the operation of said ignition system independent of the orientation of said switch case.

5. A safety circuit for the ignition system of a vehicle comprising a seat belt, position-responsive means attached to said belt for establishing an electrical connection when said seat belt is placed around the driver seated in said vehicle, and means responsive to the establishing of said electrical connection for enabling the operation of said ignition system, said seat belt including two sections and said position-responsive means including first and second serially connected position-responsive switches each mounted on a respective one of said seat belt sections such that both of said switches are closed when said two seat belt sections are properly in place around said driver and said electrical connection is established when said seat belt is in place around said driver and is normally not established when said seat belt is not in place around said driver.

References Cited
UNITED STATES PATENTS

| | | | |
|---|---|---|---|
| 3,154,167 | 10/1964 | Butler et al. | 180—82 |
| 3,185,246 | 5/1965 | Maurer | 180—82 |
| 3,340,523 | 9/1967 | Whitman. | |

A. HARRY LEVY, *Primary Examiner.*